United States Patent
Vogel et al.

(10) Patent No.: US 7,049,529 B2
(45) Date of Patent: May 23, 2006

(54) OCCUPANT CLASSIFICATION SENSE ELEMENT

(75) Inventors: Mark S Vogel, Troy, MI (US); Paul J Eagle, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 130 days.

(21) Appl. No.: 10/767,827

(22) Filed: Jan. 29, 2004

(65) Prior Publication Data

US 2005/0167166 A1 Aug. 4, 2005

(51) Int. Cl.
*B60R 21/32* (2006.01)
*G01L 5/00* (2006.01)
*G01G 19/52* (2006.01)

(52) U.S. Cl. .................. 177/144; 73/862.634; 180/273
(58) Field of Classification Search ................ 180/273; 280/735; 73/862.634; 177/144
See application file for complete search history.

(56) References Cited

U.S. PATENT DOCUMENTS

| | | | |
|---|---|---|---|
| 6,070,115 A | 5/2000 | Oestreicher et al. | 701/45 |
| 6,242,701 B1 | 6/2001 | Breed et al. | 177/144 |
| 6,243,634 B1 | 6/2001 | Oestreicher et al. | 701/45 |
| 6,323,444 B1 * | 11/2001 | Aoki | 177/144 |
| 6,324,453 B1 | 11/2001 | Breed et al. | 701/45 |
| 6,431,013 B1 * | 8/2002 | Nonnenmacher et al. | 73/862.632 |
| 6,442,504 B1 | 8/2002 | Breed et al. | 702/173 |
| 6,571,647 B1 * | 6/2003 | Aoki et al. | 73/862.381 |
| 6,586,948 B1 * | 7/2003 | Aoki et al. | 324/662 |
| 6,789,435 B1 * | 9/2004 | Hopkins | 73/862.632 |
| 2003/0066362 A1 * | 4/2003 | Lee et al. | |
| 2004/0124018 A1 * | 7/2004 | Yanagi | |

FOREIGN PATENT DOCUMENTS

| | | | |
|---|---|---|---|
| JP | 2003-294520 A | * | 10/2002 |
| JP | 2004-205410 A | * | 7/2004 |

OTHER PUBLICATIONS

"Is this seat taken?" Occupant Safety, Automotive News Insight, Tim Moran, Oct. 21, 2002.

* cited by examiner

*Primary Examiner*—Randy W. Gibson
(74) *Attorney, Agent, or Firm*—Ralph E. Smith

(57) ABSTRACT

An occupant classification sense element is provided. The sense element has a body having a center portion, a first attachment portion connected to the center portion by a first flexible beam, and a second attachment portion connected to the center portion by a second flexible beam. First and second strain sensing elements are attached to the first flexible beam and third and fourth strain sensing elements are attached to the second flexible beam. The first, second, third and fourth strain sensing elements cooperate to produce an electrical signal indicative of a force deflecting the first and second flexible beams.

17 Claims, 1 Drawing Sheet

OCCUPANT CLASSIFICATION SENSE ELEMENT

FIELD OF INVENTION

This invention relates generally to devices for determining the weight of a seated vehicle occupant. More particularly, this invention relates to such a device that operates to isolate and measure a seat occupant's weight from other forces acting on the seat.

BACKGROUND

In modern vehicles, passive safety systems such as airbags are becoming increasingly dependent on data about vehicle occupants. The data is often used by the system to determine each occupant's seating position, mass, and center of gravity. Each occupant's weight is useful in making the determinations.

One method of measuring an occupant's weight is to place a force sensor in the load path between the vehicle floor and the seat structure. The force sensor then provides a signal indicative of a seat occupant's weight. Such sensors, as disclosed in Oestereicher et al., U.S. Pat. No. 6,070,115, are undesirably tall and cause the seat structure to raise from its original position when the sensor is introduced in the load path. In order to return the seat structure to its original height, the seat base, the vehicle floor, or both, must then be redesigned to lower the seat height to its original level prior to introducing the sensor in the load path.

SUMMARY

It is therefore an aspect of the invention to provide an occupant classification sensor having a low profile to minimize its effect on seat height when installed.

In accordance with this aspect, an occupant classification sense element is provided. The sense element has a body having a center portion, a first attachment portion connected to the center portion by a first flexible beam, and a second attachment portion connected to the center portion by a second flexible beam. First and second strain sensing elements are attached to the first flexible beam and third and fourth strain sensing elements are attached to the second flexible beam. The first, second, third and fourth strain sensing elements cooperate to produce an electrical signal indicative of a force deflecting the first and second flexible beams.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the invention, its applications, or uses. Other functions may also be implemented as indicated in this specification.

Figure 1:
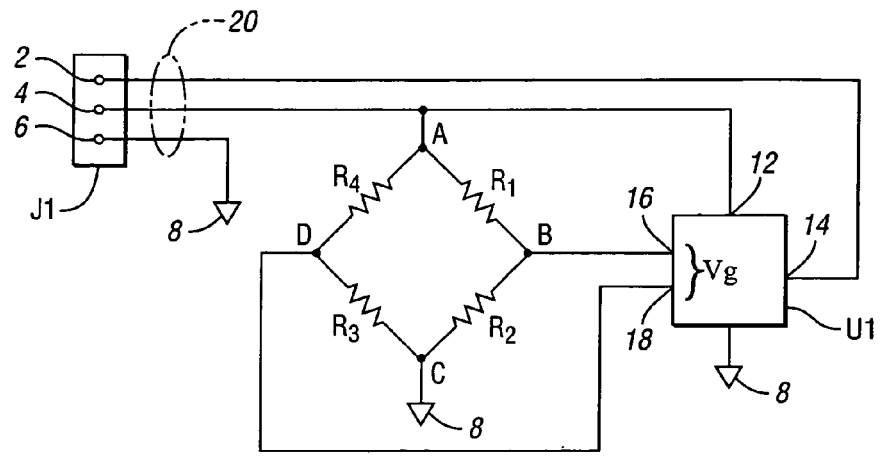
FIG. 1 depicts a schematic diagram in accordance with electrical elements of the present invention.

Turning now to FIG. 1, a schematic diagram of electrical aspects of a sense element is shown. Strain sensing elements $R_1$–$R_4$ are arranged in a Wheatstone bridge configuration and supplied with excitation voltage at node A. Node C is referenced to ground 8. Nodes B and D provide the differential output across the bridge. Placement of the strain sensors is discussed later herein.

The differential output of the bridge is connected to a signal conditioning circuit, which is preferably embodied in the form of an application specific integrated circuit (ASIC) U1. The ASIC U1 conditions the signal from the differential output of the bridge. Signal conditioning may include functions such as a low-pass filter, thermal compensation, and zeroing an offset in the differential output of the Wheatstone bridge. ASIC U1 has first 16 and second 18 bridge inputs for receiving the signal from the differential output. A signal output 14 provides a conditioned electrical signal for use by external devices, such as components of a passive safety system. In a preferred embodiment, the signal output is an analog signal, thereby avoiding quantization errors that may be introduced by a digital output. The ASIC U1 receives power through power input 12 and is electrically referenced to ground 8. Connector J1 is attached to the ASIC U1 by cable 20 and may be used to connect the circuit to the external devices. Output terminal 2 provides the conditioned electrical signal, excitation terminal 4 provides voltage to the ASIC U1 and the Wheatstone bridge, and ground terminal 6 provides a connection to ground 8. Both output terminal 2 and excitation terminal 4 are referenced to ground terminal 6.

Figure 2:
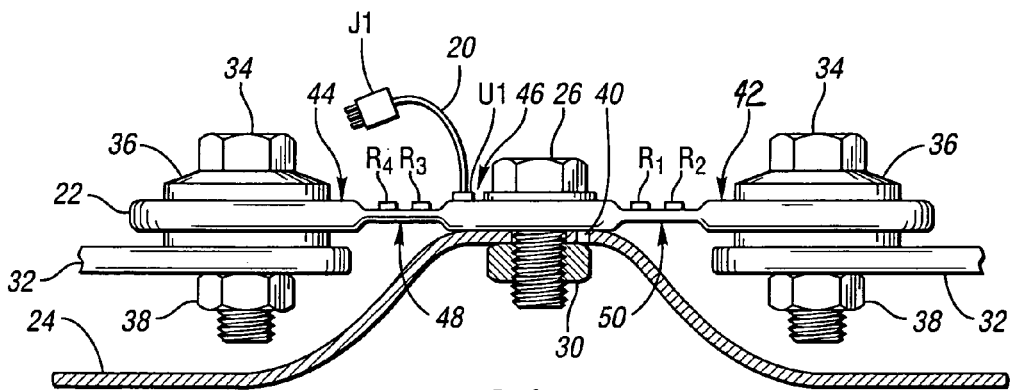
FIG. 2 depicts a side view of an occupant classification element at rest.

Turning now to FIG. 2, a side view of a sense element is shown. The sense element is installed in a load path between a seat frame 32 and a floor pan 24. A body 22 has a first attachment portion 42, a second attachment portion 44, and a center portion 46. A first flexible beam 50 connects the first attachment portion 42 to the center portion 46. Similarly, a second flexible beam 48 connects the second attachment portion 44 to the center portion 46. Preferably first and second attachment portions are located opposite each other and coplanar with the center portion 46, located equidistant between them. Body 22 is preferably formed from a metal having a high yield strength and low modulus of elasticity, such as titanium.

The center portion 46 is attached to a structure, such as floor pan 24. Attachment may be achieved with a bolt 26 threadably engaged to a nut 30, or by other suitable means.

The first and second attachment portions 42, 44, are each connected to seat frame 32 by seat bolts 36 and nuts 38. Each bolt 36 has a flanged head for evenly distributing the bolt-clamping load around its respective mounting portion. A washer is interposed between each mounting portion and its mating section of seat frame 32 to manage the clamping load. Each washer also cooperates with the flange of its mating bolt to provide a uniform strain field throughout their respective attachment portion.

Each flexible beam 48, 50 has strain sensing elements positioned on either the top or bottom of its surface, but not both. Strain sensing elements R4 and R3 of the Wheatstone bridge are positioned on flexible beam 48, with R4 being positioned towards mounting portion 44 and R3 being positioned towards center portion 46. Similarly, strain sensing elements R1 and R2 are positioned on flexible beam 50, with R2 being positioned towards mounting portion 42 and R1 being positioned towards center portion 46. The strain sensing elements are preferably positioned symmetrically about center portion 46. In addition, positioning the strain sense elements closer to their neighboring mounting portions, or center portion, increases the sensitivity of the sense element. However, doing so increases the possibility of the strain sense elements being biased due to residual strain from clamping forces by bolts 26 and 34. Strain sense elements R1–R4 are preferably a film resistor formed from ruthenium dioxide.

ASIC U1 is positioned on body 22 and preferably potted to protect it from the environment. Cable 20 and connector J1 provide a connection to ASIC U1.

In operation, the weight of an occupant is applied to seat base 32 in a direction towards floor pan 24. With the weight applied, mounting points 42, 44 deflect downward toward the floor pan 24. with mounting points 42, 44 so deflected, flexible beams 48 and 50 will assume an S-shaped curvature. In the regions of strain sense elements R3 and R1, the flexible beams 48 and 50 will be in tension, thereby reducing the resistance of elements R3 and R1 from their nominal values. In the regions of strain sense elements R4 and R2, flexible beams 48 and 50 will be in compression, thereby increasing the resistance of strain sense elements R4 and R2 from their nominal values. These changes in resistance will upset the balance of the Wheatstone bridge. The unbalanced voltage at nodes D-B of the bridge is then amplified by ASIC U1 to provide an indication of the weight applied to the seat base 32. The indication appears as a voltage at pin 2 of connector J1.

Figure 3:
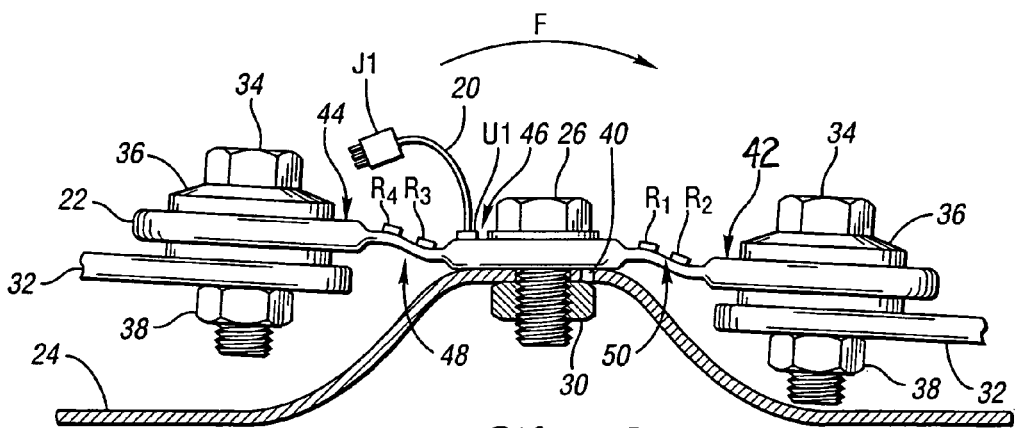
FIG. 3 depicts a side view of an occupant classification under load.

Turning to FIG. 3, operation of the sense element is shown with a moment force F applied to seat base 32. In this situation, flexible beams 48 and 50 are in compression in the proximity of strain sense elements R3 and R2, thereby decreasing their resistance from their nominal values. Simultaneously, flexible beams 48 and 50 are in tension in the proximity of strain sense elements R4 and R1, thereby increasing their resistance from their nominal values. In this case, the Wheatstone bridge remains in balance and no, or little, net force is indicated by a voltage across nodes D-B. The effect of the moment force on any occupant weight reading is thereby minimized.

The description of the invention is exemplary in nature and, thus, variations that do not depart from the gist of the invention are intended to be within the scope of the invention. Such variations are not to be regarded as a departure from the spirit and scope of the invention.

What is claimed is:

1. An occupant classification system for use with a seat mounting arrangement in a vehicle for coupling a seat base to a vehicle floor, the system comprising:
    a sensor element having a body having a center portion adapted for securing to a floor of the vehicle, a first attachment portion connected to said center portion by a first flexible beam, and a second attachment portion connected to said center portion by a second flexible beam, said first and second attachment portions being rigidly secured directly to said seat base;
    first and second strain sensing elements attached to said first flexible beam and third and fourth strain sensing elements attached to said second flexible beam;
    whereby said first, second, third and fourth strain sensing elements cooperate to produce an electrical signal indicative of a force applied to said seat base, thereby deflecting said first and second flexible beams in substantially S-shaped bends.

2. The occupant classification system of claim 1 wherein said body is formed of a metal having high yield strength and low modulus of elasticity, such as titanium.

3. The occupant classification system of claim 1 wherein said center portion, first attachment portion, and said second attachment portion are coplanar.

4. The occupant classification system of claim 1 wherein said first, second, third, and fourth strain sensing elements are formed of ruthenium dioxide.

5. The occupant classification system of claim 1 wherein said first, second, third, and fourth strain sensing elements are arranged in a Wheatstone bridge and said electrical signal is derived from an output of said Wheatstone bridge.

6. The occupant classification system of claim 5 further comprising a signal conditioning circuit having an input coupled to the Wheatstone bridge output for receipt of the electrical signal.

7. The occupant classification system of claim 6 wherein said signal conditioning circuit has an analog electrical output indicative of said input.

8. The occupant classification system of claim 1 wherein the first strain sensing element is attached to the first flexible beam adjacent the center portion, and the second strain sensing element is attached to the first flexible member between the first strain sensing element and the first attachment portion such that the first and second strain sensing elements are positioned on opposite sides of a central inflection point of the first flexible beam whenever the first flexible beam assumes an S-shaped bend under load.

9. The occupant classification system of claim 8 wherein the first and second strain sensing elements are attached to a same surface of the first flexible beam whereby whenever the first flexible beam assumes an S-shaped bend under load, one of the first and second strain sensing elements is in tension and the other of the first and second strain sensing elements is in compression.

10. The occupant classification system of claim 1 wherein at least one of the first and second attachment portions is secured directly to the seat base by a fastener having a flanged head for evenly distributing a fastener clamping load around the at least one first and second attachment portion.

11. The occupant classification system of claim 10 wherein the fastener comprises a threaded bolt and nut combination, the bolt carrying the flanged head.

12. The occupant classification system of claim 11 further comprising a washer interposed between the at least one first and second attachment portion and the seat base for managing clamping load.

13. The occupant classification system of claim 1 wherein the first and third strain sensing elements are respectively attached to the first and second flexible beams adjacent the center portion, and the second and fourth strain sensing elements are respectively attached to the first and second flexible beams such that the second strain sensing element lies between the first strain sensing element and the first attachment portion and the fourth strain sensing element lies between the third strain sensing element and the second attachment portion, the first and second strain sensing elements being positioned on opposite sides of a central inflection point of the first flexible beam whenever the first flexible beam assumes an S-shaped bend under load, and the third and fourth strain sensing elements being positioned on opposite sides of a central inflection point of the second flexible beam whenever the second flexible beam assumes an S-shaped bend under load.

14. The occupant classification system of claim 13 wherein the first and second strain sensing elements are attached to a same surface of the first flexible beam and the third and fourth strain sensing elements are attached to a same surface of the second flexible beam.

15. The occupant classification system of claim 14 wherein the first, second, third and fourth strain sensing elements are arranged as a Wheatstone bridge which is unbalanced whenever both the first and second attachment portions are deflected in a same direction.

16. The occupant classification system of claim 14 wherein the first, second, third and fourth strain sensing elements are arranged as a Wheatstone bridge which remains substantially balanced whenever only one of the first and second attachment portions is deflected.

17. The occupant classification system of claim 14 wherein the first, second, third and fourth strain sensing elements are arranged as a Wheatstone bridge which remains substantially balanced whenever the first and second attachment portions are deflected in opposite directions.

* * * * *